United States Patent
Bhaskaran (10) Patent No.: US 10,805,497 B2
(45) Date of Patent: Oct. 13, 2020

(54) DEVICE SETTINGS BASED ON USAGE HISTORY

(71) Applicant: Hewlett-Packard Development Company, L.P., Spring, TX (US)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,286

(22) PCT Filed: Jul. 24, 2017

(86) PCT No.: PCT/US2017/043443
§ 371 (c)(1),
(2) Date: Mar. 7, 2019

(87) PCT Pub. No.: WO2018/057097
PCT Pub. Date: Mar. 29, 2018

(65) Prior Publication Data
US 2019/0356806 A1    Nov. 21, 2019

(30) Foreign Application Priority Data

Sep. 23, 2016   (IN) .............................. 201641032569

(51) Int. Cl.
G06F 3/12 (2006.01)
H04N 1/00 (2006.01)
H04L 29/08 (2006.01)
H04W 4/80 (2018.01)
H04W 88/02 (2009.01)

(52) U.S. Cl.
CPC ......... *H04N 1/00973* (2013.01); *H04L 67/22* (2013.01); *H04L 67/306* (2013.01); *H04N 1/00281* (2013.01); *H04N 1/00474* (2013.01); *H04N 2201/0094* (2013.01); *H04W 4/80* (2018.02); *H04W 88/02* (2013.01)

(58) Field of Classification Search
CPC .......... H04N 1/00973; H04N 1/00474; H04N 1/00281; H04N 2201/0094; H04L 67/22; H04L 67/306; G06F 15/177; H04W 4/80; H04W 88/02; H04B 5/00; H04B 5/0056
USPC ........................................ 358/1.1–1.18, 402
See application file for complete search history.

(56) References Cited

U.S. PATENT DOCUMENTS

| | | | |
|---|---|---|---|
| 6,754,731 B2 | 6/2004 | Gargi et al. | |
| 7,190,467 B2 | 3/2007 | Simpson et al. | |
| 9,047,541 B2 | 6/2015 | Kavanapillil et al. | |
| 9,216,591 B1 | 12/2015 | Rozier et al. | |

(Continued)

OTHER PUBLICATIONS

Printer Logic ~ Windows Shared Printers Settings, 2010\2016, https://www.printerlogic.com/ ~ 2 pages.

*Primary Examiner* — Gabriel I Garcia
(74) *Attorney, Agent, or Firm* — HP Inc. Patent Department (57) ABSTRACT

In one example, a system is disclosed, which may include a recognition unit to obtain a user profile from a mobile device via a short-range wireless communication between the mobile device and the multi-functional device. Further, the system may include a retrieving unit to retrieve usage history associated with the user profile. Furthermore, the system may include a configuration unit to temporarily configure operational settings for the multi-functional device based on the usage history.

15 Claims, 6 Drawing Sheets

(56) References Cited

U.S. PATENT DOCUMENTS

| | | |
|---|---|---|
| 2003/0078986 A1 | 4/2003 | Ayres et al. |
| 2006/0250631 A1 | 11/2006 | Igarashi |
| 2007/0067269 A1 | 3/2007 | Rudge et al. |
| 2008/0252936 A1* | 10/2008 | Stratton ............. H04N 1/00222 358/403 |
| 2010/0069008 A1 | 3/2010 | Oshima et al. |
| 2011/0116125 A1 | 5/2011 | Park |
| 2011/0314132 A1 | 12/2011 | Penrose Barton et al. |
| 2014/0129301 A1 | 5/2014 | Van Wiemeersch et al. |
| 2015/0138597 A1 | 5/2015 | Koshigaya |
| 2015/0363856 A1* | 12/2015 | Rinicella ................. H04W 4/80 705/26.61 |

* cited by examiner

| DISPLAY SETTINGS 312 | JOB 316 | JOB ID | PRINTER DEVICE SETTINGS 314 | |
|---|---|---|---|---|
| LANGUAGE: CHINESE | PRINT | PRINT JOB 1 | PRINT SETTINGS A | |
| | | PRINT JOB 2 | PRINT SETTINGS C | |
| TEXT SIZE : 14 | | PRINT JOB 3 | PRINT SETTINGS A | |
| | | PRINT JOB 4 | PRINT SETTINGS A | |
| TEXT COLOR: BLACK | | PRINT JOB 5 | PRINT SETTINGS B | ~ 318 |
| | SCAN | SCAN JOB 1 | SCAN SETTINGS A | |
| TEXT STYLE: ARIAL | | SCAN JOB 2 | SCAN SETTINGS B | |
| | | SCAN JOB 3 | SCAN SETTINGS C | |
| DISPLAY BRIGHTNESS: 75% | | SCAN JOB 4 | SCAN SETTINGS B | |
| | | SCAN JOB 5 | SCAN SETTINGS D | ~ 320 |
| SCREEN RESOLUTION: 1000dpi | COPY | COPY JOB 1 | COPY SETTINGS A | |
| | | COPY JOB 2 | COPY SETTINGS A | |
| DISPLAY ICON SIZE: 10 | | COPY JOB 3 | COPY SETTINGS A | |
| | | COPY JOB 4 | COPY SETTINGS B | |
| DISPLAY ICON TYPE: FOLDER | | COPY JOB 5 | COPY SETTINGS C | ~ 322 |

USAGE HISTORY OF USER-X 300E

DEVICE SETTINGS BASED ON USAGE HISTORY

BACKGROUND

In a networked environment, multiple multi-functional devices (MFDs) may have different operational capabilities. For instance, each MFD may be capable of performing an operation (e.g., print, scan, fax, and photocopy) complying to a plurality of settings, such as orientation, paper size, resolution, speed, output type, and the like. In enterprises/organizations, each MFD may be set up with default settings and may be shared by a plurality of users.

BRIEF DESCRIPTION OF THE DRAWINGS

Examples are described in the following detailed description and in reference to the drawings, in which.

DETAILED DESCRIPTION

In a networked environment, a MFD (e.g., printing device) may be shared by a number of users. The users sharing the MFD in an office/enterprise environment may encounter constant user experience issues related to operational settings as default settings, for instance, defined by an administrator may not suit requirement of the users. For example, one user may prefer the language to be set as English, while another user may prefer the language to be set as Chinese. So when any user changes the language, for instance, to Chinese, the next user may have a bad user experience especially when the user does not understand Chinese language. Similarly, some users may always take a color copy and some users may take black and white copies. The default settings may have to be modified by the users each time when the users prefer to have different settings.

Examples described herein may enable a user to register a mobile device with a MFD. When the user approaches the MFD for executing a job (e.g., copy job, scan job, print job or fax job), the MFD may identify the user by pairing up with the user's registered mobile device via a short-range wireless communication (e.g., near field communication (NFC), a radio frequency identification (RFID) communication, a Bluetooth communication, or a Gigabit Wireless (WiGig) communication). The MFD may store default settings (original state) of the MFD. Further, the MFD may record operational settings associated with the print job and store data associated with the recorded operational settings in memory of the mobile device over the short-range wireless communication or memory of the MFD. Once the user moves back, the connection may go off and the MFD may restore the default settings.

When the user approaches the MFD for executing a subsequent job, the MFD may establish a connection with the mobile device of the user via the short-range wireless communication. Further, the MFD may obtain a user profile (e.g., to identify the user) from the mobile device upon establishing the connection. The MFD may retrieve usage history (e.g., recoded operational settings) associated with the user profile. Furthermore, the MFD may be temporarily configured with the recorded operational settings based on the usage history until the mobile device and the MFD are within the short-range wireless communication.

Figure 1:
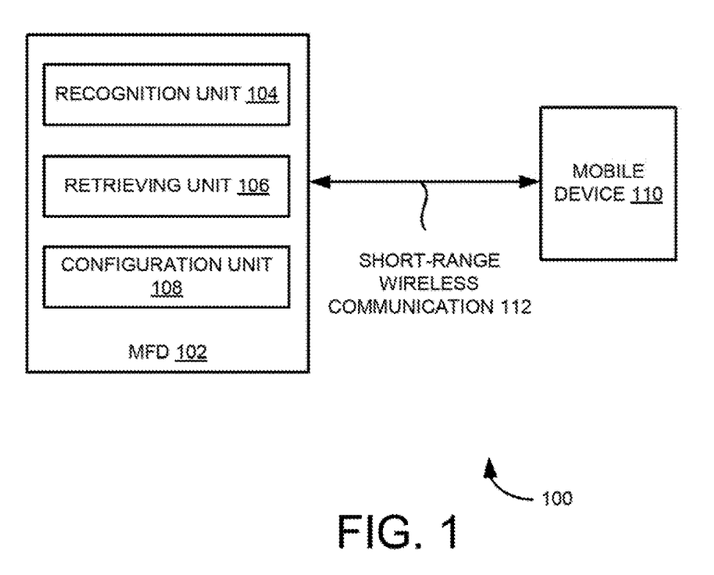
FIG. 1 is a block diagram of an example environment including a MFD and a mobile device communicating via a short-range wireless communication.

Turning now to the figures, FIG. 1 is a block diagram of an example environment 100 including a MFD 102 communicatively coupled to a mobile device 110. As used herein, the term "MFD" may refer to a printing device that may encompass any apparatus that accepts a job-request and performs at least one of the following functions or tasks: print, scan, copy, and/or fax. Example job may include a print job, a scan job, a copy job and/or a fax job. The terms "job" and "job-request" may be used interchangeably throughout the document. In one example, MFD 102 may be communicatively coupled to mobile device 110 via a short-range wireless communication 112.

Figure 2:
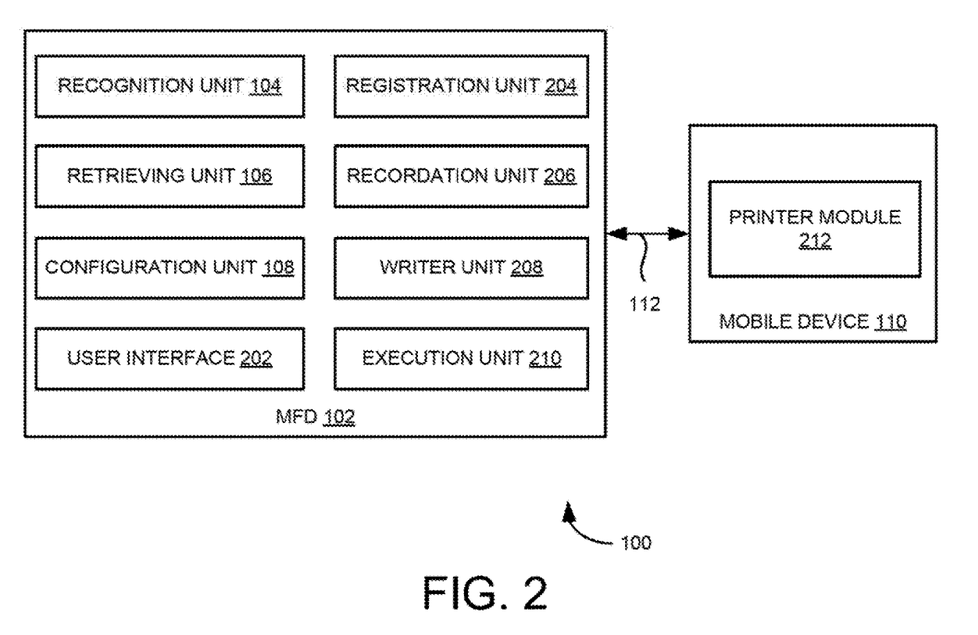
FIG. 2 is a block diagram of the example environment shown in FIG. 1, depicting additional components.

As shown in FIG. 1, MFD 102 may include a recognition unit 104, a retrieving unit 106, and a configuration unit 108. FIG. 2 is a block diagram of example environment 100 shown in FIG. 1, depicting additional components. As shown in FIG. 2, MFD 102 may include a user interface 202, a registration unit 204, a recordation unit 206, a writer unit 208, and an execution unit 210. Further, mobile device 110 may include a printer module 212, for instance, residing in memory of mobile device 110. Printer module 212 may be a printer driver that is either installed in or accessible to mobile device 110 to access MFD 102.

During operation, user interface 202 may enable a user to interact with MFD 102. For example, MFD 102 may include a control panel screen to display a list of printer parameters supported by MFD 102 so that a user can select the parameters that the user desires to use. Further, MFD 102 may include control panels having user interface 202 to allow users to interact with the control panel screen, such as keypads, touchscreens, and the like. Example user interface may include, but not limited to, a touch screen, a two-line liquid crystal display (LCD) or a graphical LCD. In one example, the job-request may be given to MFD 102 via user interface 202. In another example, the job-request may be given to MFD 102 through mobile device 110 using printer module 212 installed in mobile device 110.

Further during operation, registration unit 204 may enable a user to register mobile device 110 of the user with MFD 102, for instance using a user profile. Further, the user may select operational settings via user interface 202 and control panel (not shown) for executing jobs. Recordation unit 206 may record the operational settings associated with jobs given by the user and processed by MFD 102 upon registering mobile device 110. Furthermore, writer unit 208 may store the recorded operational settings in memory associated with MFD 102 or share the recorded operational settings to the registered mobile device 110 via short-range wireless communication 112.

Example operational settings may include display settings and device settings. Used herein, display settings may refer to language settings, text-size, text-color, display brightness, screen resolution, display icon size, and the like to display the content on a display panel (i.e., control panel) of MFD 102. Further, device settings may correspond to at least one of printer settings, copier settings, scanner settings, and fax settings that can be set for processing an associated job. In one example, printer settings may include color settings (i.e., color/black & white (B/W)), paper size, print medium type, resolution settings, orientation, duplex/simplex, number of copies, print quality, and the like to print a document. In another example, the copier settings may include magnification (zoom), page size, media type, duplex/simplex, number of copies, print quality and the like to copy/print the document. Yet in another example, scanner settings may include image type, resolution, image size, scan-to-email and the like to scan the document. Yet in some other example, fax settings may include recipient's name, fax number, number of pages, and the like to fax the document.

When registered mobile device 110 is in short-range wireless communication 112 with MFD 102, recognition unit 104 may identify registered mobile device 110 and obtain the user profile from mobile device 110 via short-range wireless communication 112. Example user profile may include a user identifier (ID) (e.g., a username), which is used to differentiate the user from other users. Example short-range wireless communication 112 may include a NFC, a RFID communication, a Bluetooth communication, or a WiGig communication.

Retrieving unit 106 may retrieve usage history associated with the user profile. The usage history may include the operational settings associated with jobs that have been previously processed by MFD 102. In one example, retrieving unit 106 may retrieve the usage history associated with the user profile from MFD 102. In another example, retrieving unit 106 may obtain the usage history associated with the user profile from registered mobile device 110 via short-range wireless communication 112. For example, the usage history may be obtained using a pull model or a push model. In pull model, retrieving unit 106 may retrieve the usage history from memory associated with MFD 102 or from mobile device 110 via short-range wireless communication 112. In push model, printer module 212 may send the usage history stored in mobile device 110 to MFD 102 via short-range wireless communication 112.

Further during operation, configuration unit 108 may temporarily configure operational settings for MFD 102 based on the retrieved usage history. The temporarily configured operational settings are selected based on the usage history that includes previous operational settings associated with each previously processed job. In one example, MFD 102 may be temporarily configured with the operational settings associated with a previous job (e.g., last executed job) that has been executed corresponding to the user profile. In another example, MFD 102 may be temporarily configured with the operational settings that have been used maximum number of times over a period of time corresponding to the user profile. Furthermore, execution unit 210 may execute at least one job given by the user using the temporarily configured operational settings. In one example, the temporarily configured operational settings may be used by MFD 102 for processing the given job upon validation by the user. Examples for temporarily configuring the operational settings for MFD 102 are explained in detail in FIGS. 3A-3E.

In one example, the components of MFD 102, and mobile device 110 may be implemented in hardware, machine-readable instructions or a combination thereof. In one example, each of recognition unit 104, retrieving unit 106, configuration unit 108, user interface 202, registration unit 204, recordation unit 206, writer unit 208, and execution unit 210 of MFD 102, and printer module 212 of mobile device 110, may be implemented as engines or modules comprising any combination of hardware and programming to implement the functionalities described herein. Even though FIGS. 1 and 2 describe about mobile device 110, the functionality of the components of mobile device 110 may be implemented in other portable electronic devices such as smart phones, personal digital assistants (PDAs), smart watches and the like.

Mobile device 110 and MFD 102 may include computer-readable storage medium comprising (e.g., encoded with) instructions executable by a processor to implement functionalities described herein in relation to FIGS. 1-2. In some examples, the functionalities described herein, in relation to instructions to implement functions of components of mobile device 110 and MFD 102 and any additional instructions described herein in relation to the storage medium, may be implemented as engines or modules comprising any combination of hardware and programming to implement the functionalities of the modules or engines described herein. The functions of components of mobile device 110 and MFD 102 may also be implemented by the processor. In examples described herein, the processor may include, for example, one processor or multiple processors included in a single device or distributed across multiple devices.

Figure 3A:
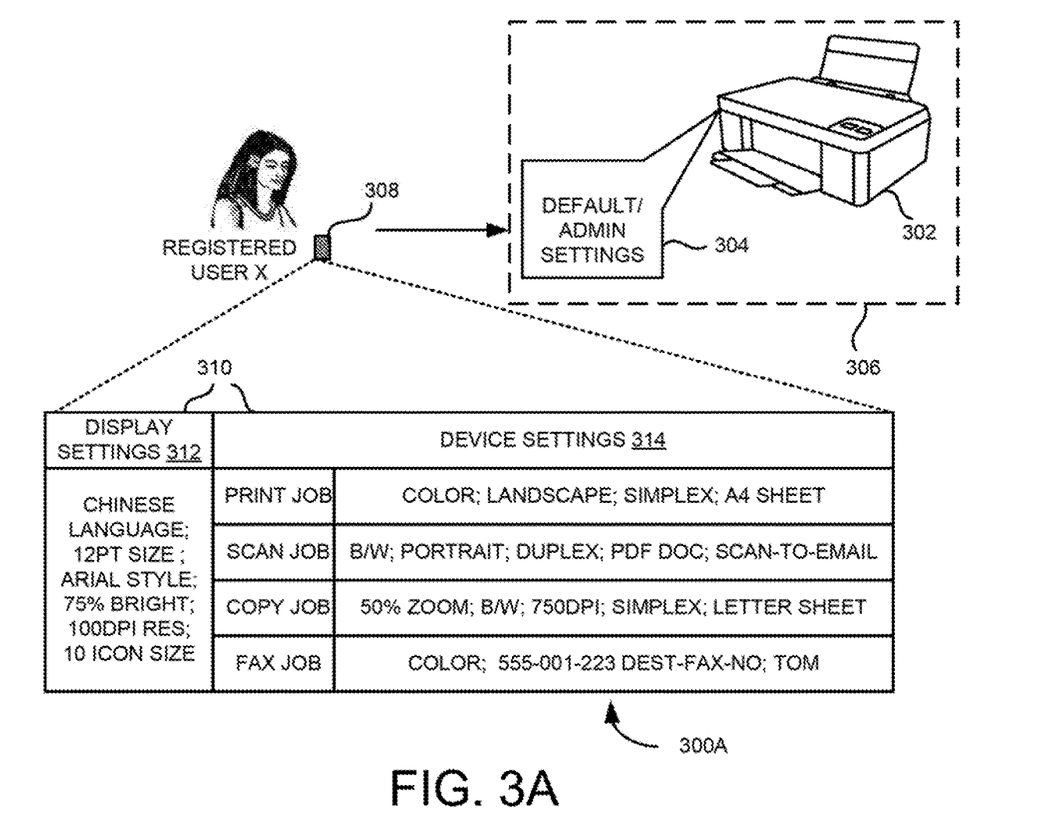
FIGS. 3A-3C are example schematic diagrams illustrating temporarily configuring operational settings for MFD based on usage history when a registered user is within the short-range wireless communication.
Figure 3B:
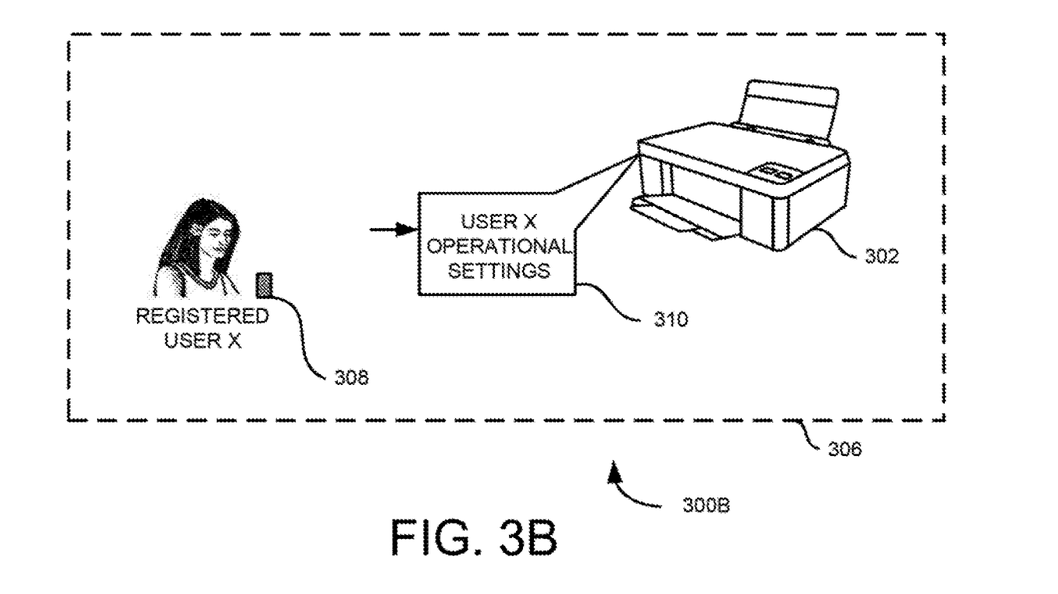
Figure 3C:
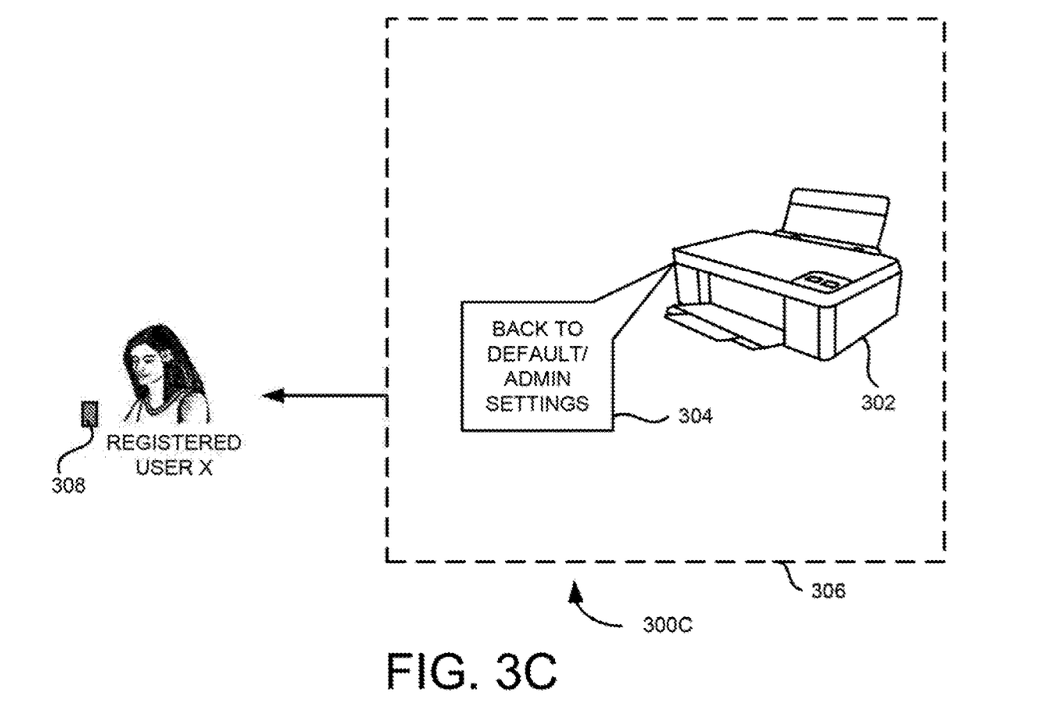
Figure 3D:
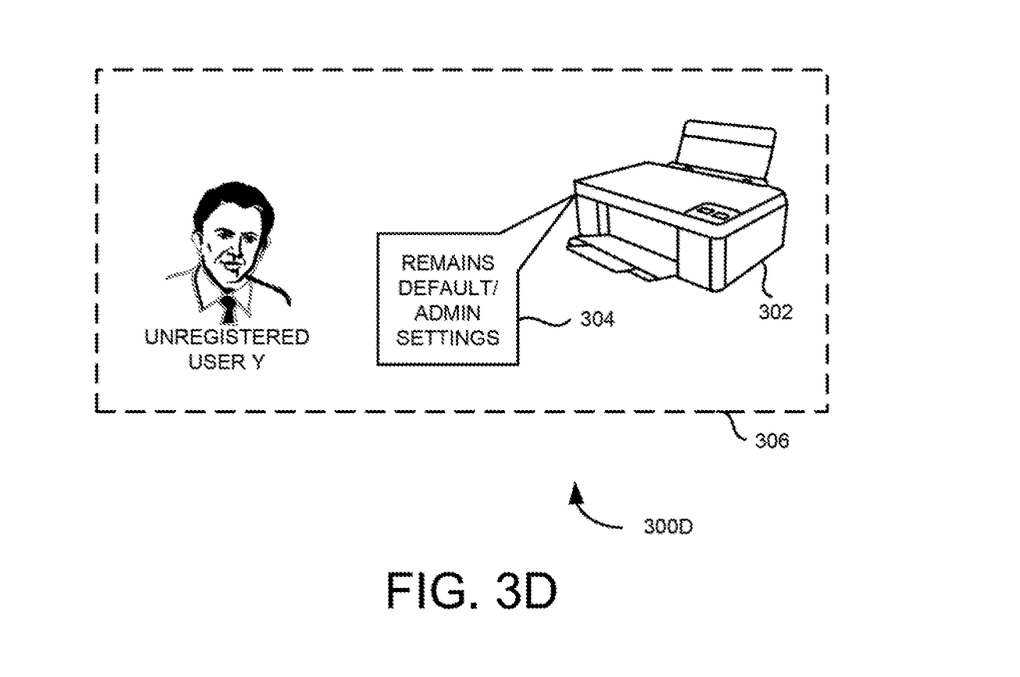
FIG. 3D is an example schematic diagram illustrating default operational settings in the MFD when an un-registered user is within the short-range wireless communication.

FIGS. 3A-3C are example schematic diagrams illustrating temporarily configuring operational settings for MFD based on usage history of a registered user when the registered user is within the short-range wireless communication. Particularly, FIG. 3A is a schematic diagram 300A, depicting operational settings 310 associated with a registered user-x, for instance, stored in mobile device 308. FIG. 3B is a schematic diagram 300B, depicting temporarily configuring MFD 302 with operational settings 310 associated with registered user-x, when registered mobile device 308 is in short-range wireless communication 306 with MFD 302. FIG. 3C is a schematic diagram 300C, depicting restoring default settings when registered user moves away from short-range wireless communication 306 range of MFD 302.

For example, as shown in FIG. 3A-3C, consider a mobile device 308 of user-x is registered with MFD 302. In this case, when registered user-x approaches and initiates a scan job 1 in MFD 302 for the first time, the operational settings of MFD 302 may be default settings 304 as set by an administrator. Upon accessing MFD 302, registered user-x may change the operational settings for performing scan job 1. For example, user-x may change display panel settings to include "Chinese language" as a language for displaying a menu content on display panel and also may change scanner-settings to include "B/W"; "750 DPI"; "SIMPLEX"; and "LETTER SHEET". Upon changing the operational settings, recordation unit 206 may record the changes made in the operational settings that is used to perform scan job 1. After execution of scan job 1, writer unit 208 may store the recorded operational settings as "scan settings A" associated with scan job 1 in the usage history of registered user-x.

Figure 3E:
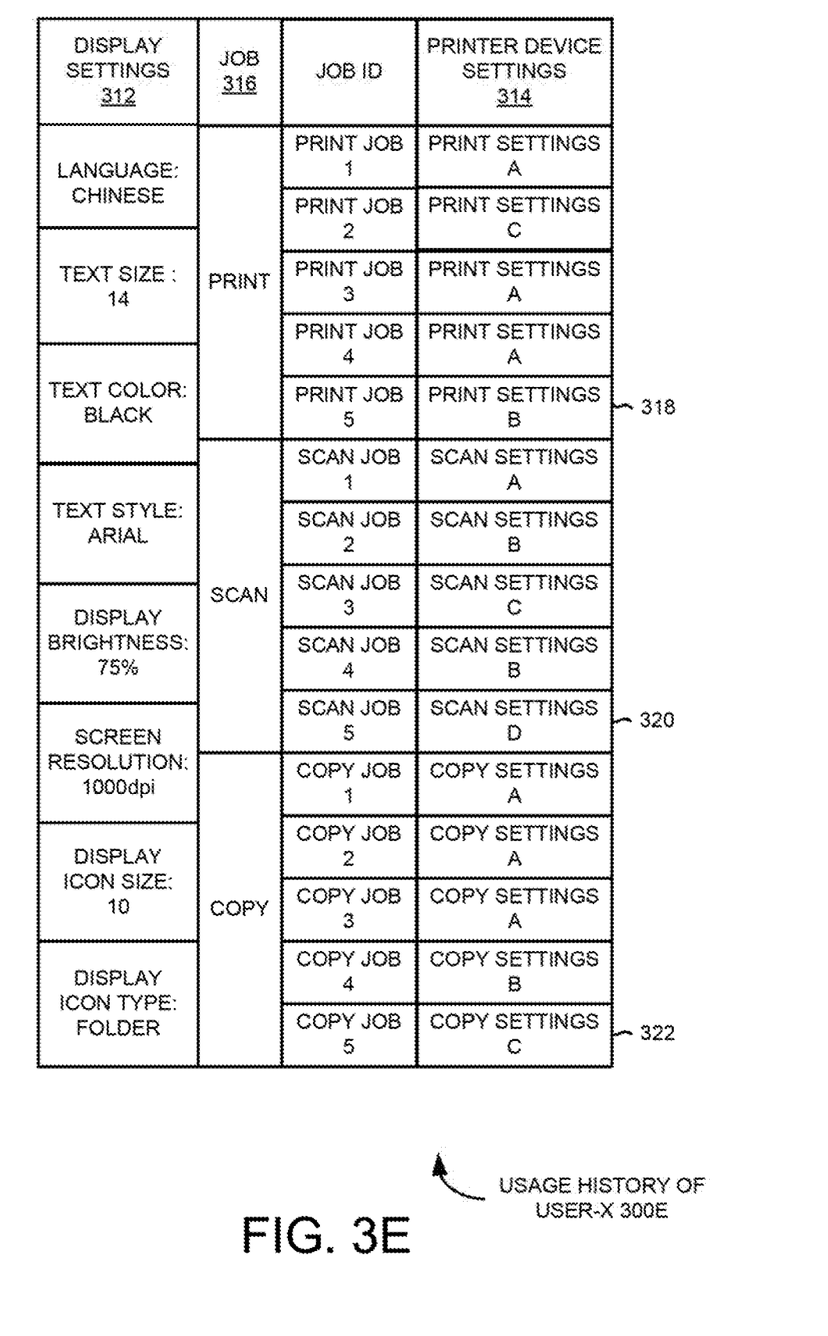
FIG. 3E illustrates an example table depicting the usage history associated with the registered user.

FIG. 3E illustrates an example table depicting usage history 300E associated with registered user-x. As an example shown in FIG. 3E, each time when registered user-x accesses MFD 302, usage history 300E may be dynamically updated using the recorded operational settings (e.g., 312 and 314) associated with each job 316 that have been processed by MFD 302. In another example, usage history 300E may be dynamically updated by replacing the last stored operational settings with operational settings associated with a currently executed job.

Recorded operational settings associated with usage history 300E may be retrieved by retrieving unit 106 to temporarily configure MFD 302 to execute a subsequent job when registered mobile device 308 and MFD 302 are connected via short-range wireless communication 306. Using the temporarily configured operational settings, execution unit 210 may execute at least one job requested by registered user-x.

In the example shown in FIG. 3E, usage history 300E may include previous operational settings associated with print jobs 1-5, respectively. For example, as shown in FIGS. 3A and 3B, consider registered user-x approaches toward MFD 302 for initiating a subsequent print job "print job 6" to print a "photo" stored in a universal serial bus (USB) device connectable to a read-slot of MFD 302. In this case, when mobile device 308 of user-x is in reach of MFD 302, the following may be performed:
  i. establish a connection between mobile device 308 and MFD 302 via short-range wireless communication 306;
  ii. obtain a user profile such as user-ID$_1$ from registered mobile device 308 upon establishing the connection;
  iii. retrieve usage history 300E associated with the user-ID$_1$, usage history 300E may include previous operational settings 310 of user-x;
  iv. temporarily configure operational settings 310 for MFD 302 (as shown in 300B) based on usage history 300E. For example, the temporarily configured operational settings may include display settings 312 and device settings 314 associated with lastly executed jobs. As shown in FIG. 3E, example device settings 314 associated with lastly executed jobs may include:
    a. Print settings B 318 associated with last print job 5,
    b. Scan settings D 320 associated with last scan job 5, and
    c. Copy settings C 322 associated with last copy job 5;
  v. enable user-x to select a particular job (e.g., print, copy, scan, or fax) by displaying "menu options" (e.g., in Chinese language) on a display panel of MFD 302;
  vi. upon selection of print job (i.e., print job 6) by user-x, execute the subsequent print job using temporarily configured "print settings B" associated with last print job 5;
  vii. record "print settings B" associated with print job 6 executed on MFD 302; and
  viii. update usage history 300E of user-x to include the recorded "print settings B" associated with print job 6.

In the above example, user-x may be allowed to change/modify temporarily configured print settings 310 (i.e., print settings B) via display panel to execute print job 6. In this case, modified print settings 310 associated with the print job 6 may be recorded and stored in memory associated with mobile device 308 or MFD 302 upon execution of print job 6.

In other example, MFD 302 may be temporarily configured with the operational settings that have been used maximum number of times over a period of time corresponding to the user profile (e.g., user-ID$_1$). As shown in FIG. 3B, when user-x intends to initiate a print job (i.e., print job 6) through MFD 302, MFD 302 may be configured with "printer settings A" that have been used maximum number of times (i.e., 3 times) corresponding to the user-ID$_1$. For example, MFD 302 may be temporarily configured with previous operational settings that have been used for last job or maximum number of times based on predefined rules.

As shown in 300C of FIG. 3C, when user-x moves away from short-range wireless communication 306 of MFD 302, operational settings of MFD 302 may be restored to default settings 304, for instance, after executing the print job triggered by user-x. In another example as shown in 300D of FIG. 3D, when an unregistered user-y approaches MFD 302 for executing a job, then MFD 302 may display default settings 304 to unregistered user-y.

In yet another example, consider user-x, user-y, and user-z may be registered users for using MFD 302. When two or more registered users (e.g., user-x, user-y, and user-z) are in short-range wireless communication 306 of MFD 302, then MFD 302 may pop-up a question to choose one of the user profiles associated with the registered users. Upon selection of one user profile (e.g., of user-z), "user settings z" may be temporarily configured for MFD 302. In this example, when a particular registered user (e.g., user-z) found to be active in short-range wireless communication 306 for a significant time, a time-out mechanism may be performed based on confirmation from a user accessing MFD 302. The time-out mechanism may allow MFD 302 to restore "default operational settings 304" from the "user settings z".

Figure 4:
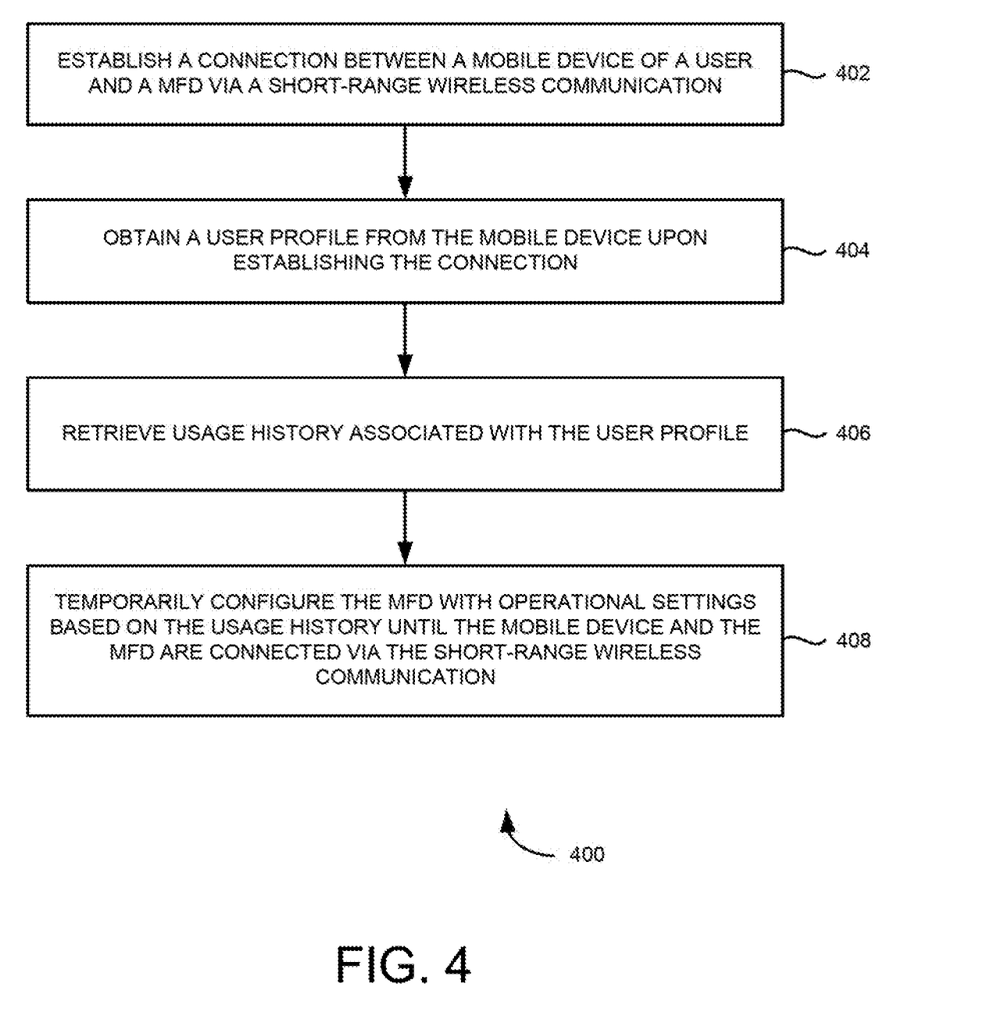
FIG. 4 depicts an example flow chart for temporarily configuring operational settings for MFD based on usage history for processing a given job.

FIG. 4 depicts an example flow chart 400 of a process for temporarily configuring operational settings for MFD to process a given job-request. It should be understood that the process depicted in FIG. 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 402, a connection between a mobile device of a user and a MFD may be established via a short-range wireless communication. The mobile device of the user may be registered with the MFD. At 404, a user profile may be obtained from the mobile device upon establishing the connection. At 406, usage history associated with the user profile may be retrieved. In one example, usage history may include previous operational settings associated with jobs that have been processed by the MFD.

At 408, the MFD may be temporarily configured with operational settings based on the usage history until the mobile device and the MFD are connected via the short-range wireless communication. In one example, the MFD may be temporarily configured with the operational settings associated with a previous job (e.g., last job) that has been executed corresponding to the user profile. In another example, the multi-functional device may be temporarily configured with the operational settings that have been used maximum number of times over a period of time corresponding to the user profile.

Further, at least one job triggered by the user may be executed using the temporarily configured operational settings. The operational settings may be selected based on the usage history that includes previous operational settings associated with jobs that have been processed by the MFD. Furthermore, user may be provided with an option on a user interface of the MFD to modify the temporarily configured operational settings to execute the at least one job.

Figure 5:
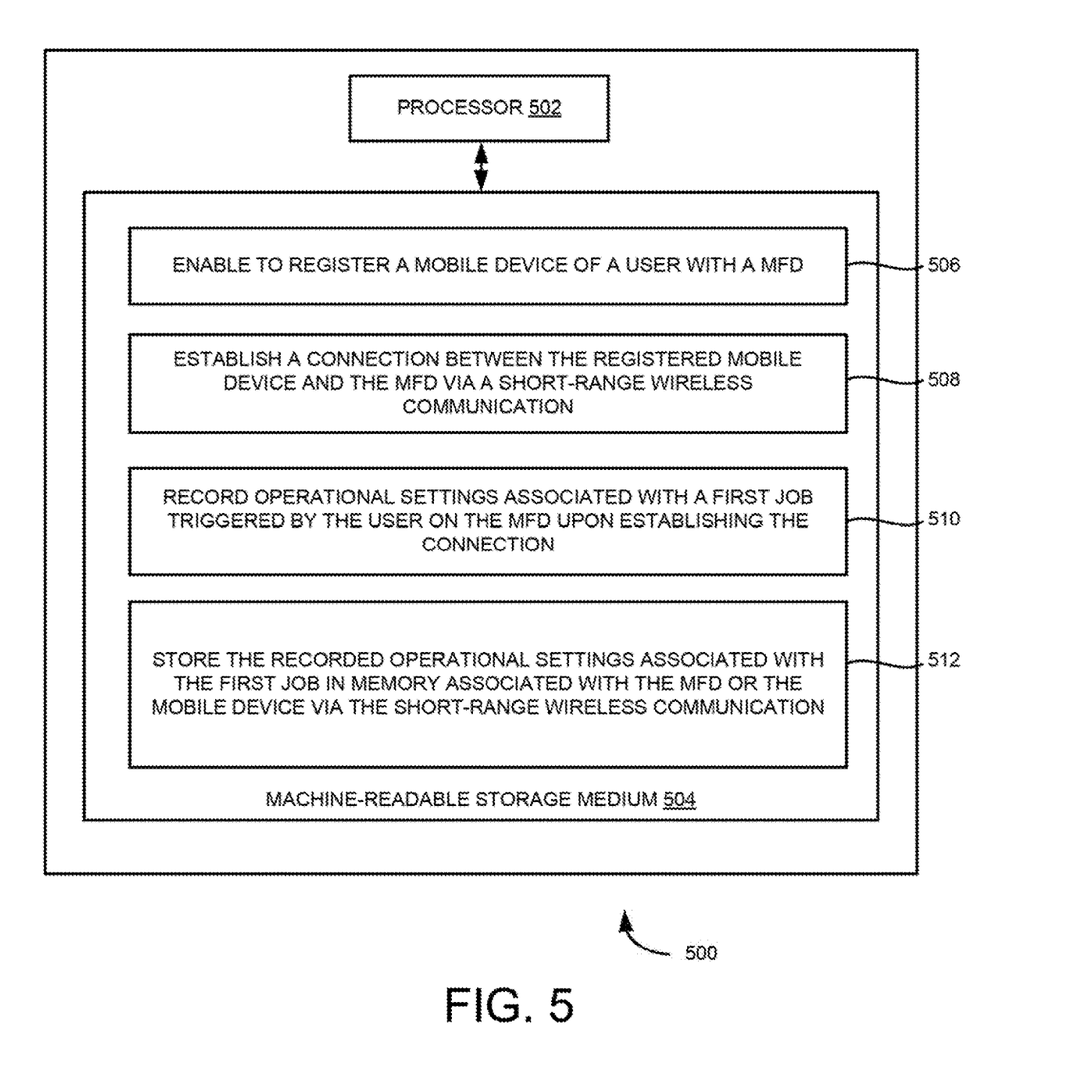
FIG. 5 depicts an example block diagram showing a non-transitory computer-readable media to temporarily configure operational settings for MFD based on usage history.

FIG. 5 illustrates a block diagram of an example MFD 500 for temporarily configuring operational settings based on usage history to process a given job. The computing device includes a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to MFD 500.

Machine-readable storage medium 504 may store instructions 506-512. In an example, instructions 506-512 may be executed by processor 502 to provide a mechanism for temporarily configuring operational settings based on usage history. Instructions 506 may be executed by processor 502 to enable to register a mobile device of a user with the MFD. Instructions 508 may be executed by processor 502 to establish a connection between the registered mobile device and the MFD via a short-range wireless communication.

Instructions 510 may be executed by processor 502 to record operational settings associated with a first job triggered by the user on the MFD upon establishing the connection. Instructions 512 may be executed by processor 502 to store the recorded operational settings associated with the first job in memory associated with the MFD or the mobile device via the short-range wireless communication. Further, the recorded operational settings are retrieved to temporarily configure the MFD to execute a subsequent job when the registered mobile device and the MFD are connected via the short-range wireless communication. Furthermore, instructions may be executed by processor to load/restore default operational settings for the MFD when the registered mobile device is not in the short-range wireless communication with the MFD.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A multi-functional device, comprising:
   printing, scanning, and copying hardware to provide printing, scanning, and copying functionality;
   short-range wireless communication hardware to establish a short-range wireless communication connection with a mobile device of a user upon the mobile device entering a communication range of the short-range wireless communication hardware;
   a processor;
   a memory storing program code executable by the processor to:
   obtain a user profile from the mobile device via the established short-range wireless communication connection;
   retrieve usage history associated with the obtained user profile;
   temporarily configure operational settings of the multi-functional device, based on the usage history, while the mobile device remains in the communication range of the short-range wireless communication hardware;
   cause the printing, scanning, and copying hardware to execute a job associated with the user profile, in accordance with the temporarily configured operational settings;
   configure the operational settings of the multi-functional device in accordance with default operational settings when the mobile device leaves the communication range of the short-range wireless communication hardware.

2. The multi-functional device of claim 1, wherein the job comprises a print job, a scan job, or a copy job.

3. The multi-functional device of claim 1, comprising:
   a user interface to interact with a user, wherein the job is triggered on the multi-functional device using the user interface or the mobile device.

4. The multi-functional device of claim 1, wherein the short-range wireless communication connection comprises a near field communication (NFC) connection, a radio frequency identification (RFID) communication connection, a Bluetooth communication connection, or a Gigabit Wireless (WiGig) communication connection.

5. The multi-functional device of claim 1, wherein the program code is executable by the processor to further:
   register the mobile device with the multi-functional device.

6. The multi-functional device of claim 5, wherein the program code is executable by the processor to further:
   store the operational settings associated with prior jobs associated with the user profile and previously processed by the multi-functional device, upon registering the mobile device.

7. The multi-functional device of claim 6, wherein the usage history comprises the stored operational settings associated with the prior jobs.

8. A method comprising:
   establishing, by a multi-functional device having printing, scanning, and copying functionality, a short-range wireless communication connection with a mobile device of a user in short-range wireless communication range of the multi-functional device;

obtaining, by the multi-functional device, a user profile from the mobile device upon establishing the connection;

retrieving, by the multi-functional device, usage history of the multi-functional device associated with the user profile; and temporarily configuring, by the multi-functional device, operational settings of the multi-functional device while the mobile device remains in the short-range wireless communication range of the multi-functional device, based on the usage history.

9. The method of claim 8, further comprising:

executing, by the multi-functional device, a job triggered by the user and using the printing, scanning, or copying functionality of the multi-functional device in accordance with the temporarily configured operational settings, wherein the operational settings are selected based on the usage history and comprise previous operational settings associated with jobs associated with the user and that have been processed by the multi-functional device.

10. The method of claim 8, wherein temporarily configuring the operational settings of the multi-functional device comprises:

temporarily configuring the multi-functional device with the operational settings that have been used no more than a maximum number of times over a period of time corresponding to the user profile.

11. The method of claim 8, wherein the mobile device of the user is registered with the multi-functional device.

12. The method of claim 8, further comprising:

providing, by the multi-functional device, an option on a user interface of the multi-functional device to modify the temporarily configured operational settings to execute a job using the printing, scanning, or copying functionality of the multi-functional device.

13. The method of claim 8, further comprising:

configuring, by the multi-functional device, the operational settings of the multi-functional device in accordance with default operational settings when the mobile device of the user is no longer in the short-range wireless communication range of the multi-functional device.

14. A non-transitory machine-readable storage medium comprising instructions executable by a multi-functional device having printing, scanning, and copying functionality to:

register a mobile device of a user with the multi-functional device;

establish a short-range wireless communication connection with the registered mobile device upon the registered mobile device entering in short-range wireless communication range of the multi-functional device;

record operational settings of the multi-functional device associated with a first job triggered by the user on the multi-functional device upon establishing the short-range wireless communication connection; and store the recorded operational settings associated with the first job in memory of the multi-functional device, wherein the recorded operational settings are subsequently retrieved to temporarily configure the operational settings of the multi-functional device when the mobile device again enters in the short-range wireless communication range of the mobile-functional device and while the mobile device remains in the short-range wireless communication range of the multi-functional device, to execute another job triggered by the user on the multi-functional device, in accordance with the temporarily configured operational settings.

15. The non-transitory machine-readable storage medium of claim 14, wherein the instructions are executable by the multi-functional device to further:

load default operational settings for the multi-functional device when the registered mobile device leaves the short-range wireless communication range of the multi-functional device.

* * * * *